June 7, 1966      D. W. PIERSON      3,254,730
PRESSURIZED VENTILATING AND SEALING SYSTEM FOR MOTOR
VEHICLE BRAKES AND DRIVE COMPONENTS
Filed July 20, 1962
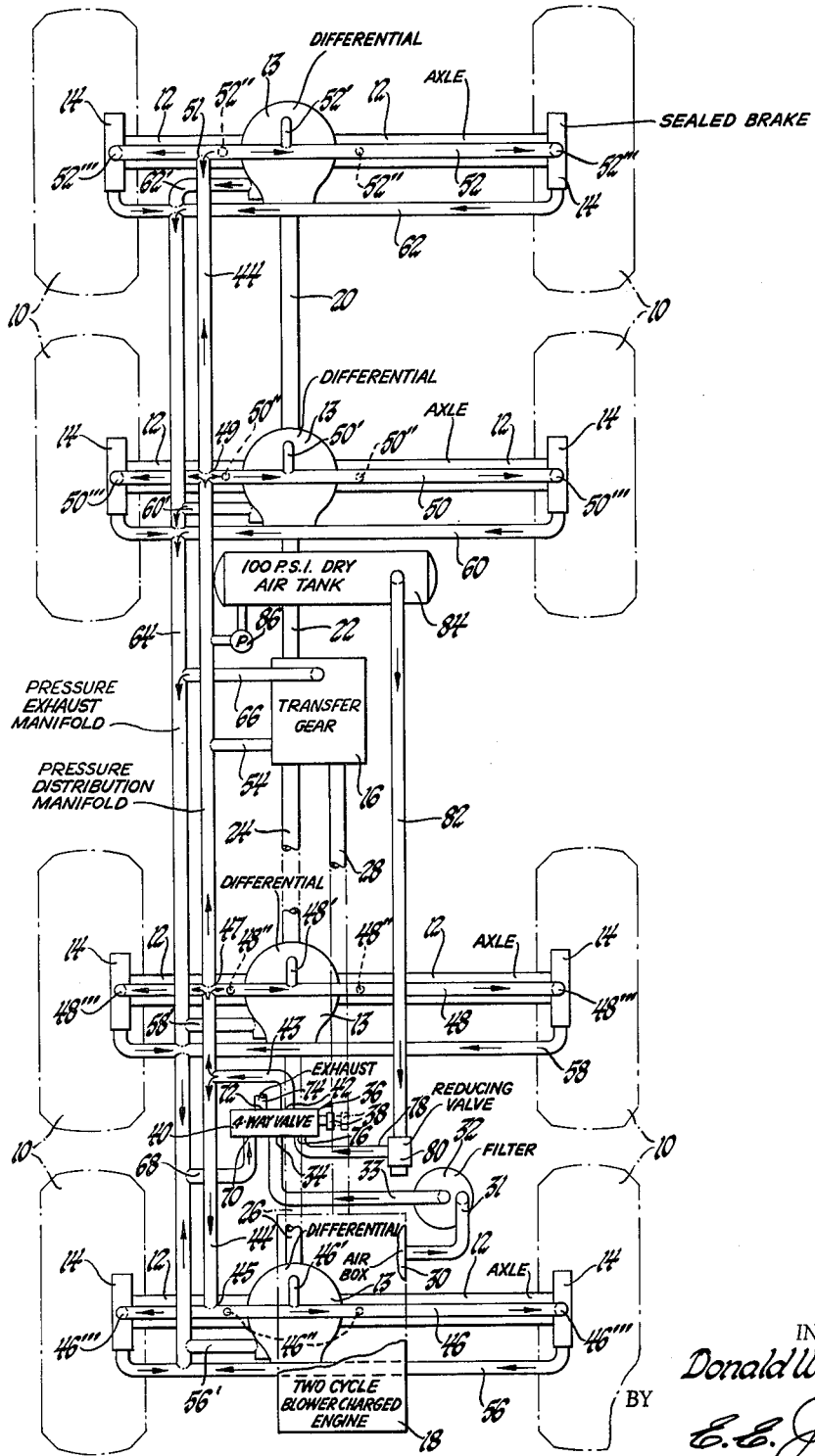
INVENTOR.
Donald Way Pierson
BY
E. E. James
ATTORNEY

3,254,730
PRESSURIZED VENTILATING AND SEALING SYSTEM FOR MOTOR VEHICLE BRAKES AND DRIVE COMPONENTS
Donald Way Pierson, Farmington, Mich., assignor to General Motors Corporation, Detroit, Mich., a corporation of Delaware
Filed July 20, 1962, Ser. No. 211,201
3 Claims. (Cl. 180—1)

This invention relates generally to a motor vehicle and particularly contemplates a system adapted to provide pressurized air for cooling ventilation and sealing of housing enclosed, sealed brakes and wheel driving components of a heavy-duty truck or similar vehicle capable of high-speed cross-country maneuvering, including fording and amphibious operation, under substantially all conditions of weather and terrain.

With vehicles of the type indicated, it is necessary to seal the vehicle brakes, the engine-to-wheel drive line components and their associated bearings to prevent contamination of these elements and of the lubrication supply by dust, moisture and other extraneous fluids. During normal cross-country land operation, the brake and drive housing seals are normally subjected to extreme external dust conditions. Some of this dust tends to collect adjacent the several seals and, because of variations in internal and external pressure differentials, tends to work through and abrade the several seals. During fording and amphibious operation, the housing seals are subjected to both the external hydraulic pressures and internal subatmospheric depressions resulting from the temperature drop occurring within the drive and brake housings. Due to such conditions, the drive and brake housing seals for such vehicles have necessarily been complex and expensive to manufacture and maintain and have been generally unsatisfactory for their intended function. The heavy loads and the high-speed maneuvering demands imposed on the drive bearings and brakes of such heavy-duty cross-country vehicles further require that means be provided for cooling the brakes and drive line components. In the past, such cooling has been provided by various combinations of air ventilation and/or cooling of the lubrication supply.

As indicated above, the instant invention contemplates utilizing air pressure supplies normally available for such vehicles to selectively provide air cooling ventilation through the various housing sealed brakes and drive line components, i.e. the transmission gear case and the several differential gear and drive axle housings, etc., for over land vehicle operation and alternately to pressurize such component housings for sealing purposes during fording and amphibious operation.

The foregoing and other objects, advantages and features of the invention will be apparent from the following detailed description of an illustrative embodiment having reference to the single diagrammatic view of accompanying drawing.

Referring more particularly to the drawing, the wheels and inflatable tires of a vehicle of the type indicated are outlined in broken lines at 10. These wheels are rotatably and drivingly supported on laterally opposite sides of the vehicle chassis by axles rotatably supported and sealingly embraced by transverse axle housings 12. These axle housings may be either formed integrally with differential gear housings 13 or they may be separately formed and sealingly articulated therewith to provide so-called "swing" axles. The outer ends of the axle housings are sealingly embraced by brake housings 14 carried by the several wheels. Axle driving differential gear sets mounted within the several differential housings 13 are drivingly interconnected by suitable drive shafts to a transfer gear mechanism sealingly housed within a gear case 16. This transfer gear is in turn connected through a suitable drive shaft to an internal combustion engine 18. The several gear and engine connecting drive shafts are sealingly embraced by longitudinally extending housings indicated at 20, 22, 24, 26 and 28.

The engine 18 of the illustrative embodiment is a blower charged two-cycle engine and serves as a primary source of filtered pressurized air. The engine air box 30 is connected through a pipe 31, a moisture purging filter 32 and a pipe 33 to a pressure supply port 34 of a four-way control valve 36. The valve 36 includes a valve plunger 38 reciprocable in a valve body 40 between two pressure supply controlling positions. For normal over land operation, the valve plunger 38 is shifted to its inner position, shown in full lines. In this position, the valve plunger connects the air box pressure supplied port 34 with a port 42 connected by a pipe 43 to a longitudinally extending pressure distribution manifold 44 extending longitudinally of the vehicle. The manifold 44 is intersected at 45, 47, 49 and 51 by laterally extending pipes 46, 48, 50 and 52, respectively. These pipes are connected at 46', 48', 50', and 52' to the several differential gear housings 13 and to the axle housings 12 at 46'', 48'', 50'' and 52''. The outer ends of these laterally extending pipes are connected at 46''', 48''', 50''' and 52''' to supply pressurized air to the several sealed brake housings 14. The pressure supply manifold 44 is also connected through a pipe 54 to the sealed housing 16 of the transfer gear.

When in its inner over land control position, the valve plunger 38 also serves to vent the air box supplied air from the several housing sealed brakes and drive components. Such venting is accomplished through a plurality of pipes 56, 56', 58, 58', 60, 60' and 62, 62' which connect the several brake and differential gear housings to an air return manifold 64 paralleling the distribution manifold 44. The return manifold 64 is also connected by a pipe 66 to the transfer gear housing and by a pipe 68 to an exhaust or venting port 70 in the valve body 42. In its inner position, the valve plunger 38 interconnects and vents the port 70 through a valve port 72 to an outlet pipe 74. The pipe 74 may discharge directly into the atmosphere or it may be connected either to the blower inlet or to an engine exhaust aspirator to reduce the return piping and valve imposed restriction to venting air flow. The air circulation thus effected through the several housing sealed brakes and drive components serves to provide limited pressurized sealing and/or cooling ventilation of such components for over land vehicle operation. As the blower supplied air box pressure, the intake suction and/or the engine exhaust gas flow generally vary as functions of the engine speed and load, the effected air circulation and resultant component cooling will normally vary as a function of the loads imposed on the vehicle drive and brake components.

When shifted to its outer position, shown in broken lines, the valve plunger 38 conditions the system for fording or in-water vehicle operation. Such valve movement closes the pressure venting exhaust ports 70 and 72 and connects the valve port 42 and the pressure distributing manifold 44 through a valve body port 76 to a secondary supply of stored high pressure air. This secondary air pressure supply rapidly pressurizes the several housing sealed brakes and drive line components against water leakage during the ensuing fording and in-water vehicle operation. For this purpose, the port 76 is connected through a pressure reducing valve 80 and pipes 78 and 82 to a high-pressure air storage tank 84. This tank may be pre-charged and maintained at the desired storage pressure by an engine or motor-driven compressor pump 86. The intake of the compressor pump 86 may be connected directly to the atmosphere but is preferably connected to the manifold 44, as shown. When thus connected, the pump 86 serves to provide second stage compression for the relatively dry pressurized air received from the manifold. It should be noted that this stored secondary supply of high-pressure air is not normally dependent upon engine operation and applies a sufficient constant water-sealing air pressure to the several housing enclosed brakes and drive components. This secondary high pressure supply of air may also be used in a conventional manner to energize the several housing sealed brakes and other air-operated vehicle accessories.

From the foregoing description, it will be seen that the invention provides a relatively simple system for selectively air cooling the sealed housing enclosed brake and drive components of an amphibious vehicle for over land operation and for alternatively pressurizing such housed components against water leakage during fording and in-water operation. It will also be apparent to those skilled in the art that various changes and modifications might be made from the disclosed embodiment without departing from the spirit and scope of the invention as defined in the following claims.

I claim:

1. In a heavy duty cross-country motor vehicle including housing sealed brakes and drive components,
   first conduit means connected to each of said housing sealed brakes and drive components,
   a first pressurized air supply means selectively connectable to supply pressurized air to said first conduit means,
   a second pressurized air supply means connectable to supply pressurized air to said first conduit means at a substantially higher pressure than that normally supplied by said first air pressurizing means,
   second conduit means connected to return air from said housing sealed brakes and drive components,
   and valve means including an exhaust port and selectively operable in a first control position to connect said first pressurized air supply means to said first conduit means and to connect said second conduit means to the exhaust port thereby providing limited pressurized sealing and cooling ventilation of the several housing sealed drive components and brakes,
   said valve means being selectively operable in a second control position and to close said second conduit means from the exhaust port and to connect said first conduit means for pressurized air supply from said second pressurized air supply means thereby pressurizing and sealing the several drive components and brakes against water leakage during fording and in-water operation of the vehicle.

2. In an amphibious motor vehicle including housing sealed brakes and drive components,
   first conduit means connected to supply pressurized air to each of said housing sealed brakes and drive components,
   second conduit means connected to return air from said housing sealed brakes and drive components,
   a first air pressurizing means selectively connectable to supply pressurized air to said first conduit means,
   an air reservoir,
   a second air pressurizing means connected to said first conduit means and normally operable to further pressurize air therefrom for supply to said reservoir at a substantially higher pressure than normally supplied by said first air pressurizing means,
   pressure reducing means connected to said reservoir and selectively connectable to supply pressurized air through said first conduit means to said housing sealed brakes and drive components,
   and valve means selectively operable in a first control position to connect said first air pressurizing means for supply of pressurized air to said first conduit means and to exhaust said second conduit means thereby providing limited pressurized sealing and cooling ventilation of the several housing sealed drive components and brakes,
   said valve means being operable in a second control position to connect said first conduit means for pressurized air supply from said air reservoir through said reducing valve means and to close said second conduit means from the exhaust thereby pressurizing the several drive components and brakes to prevent water leakage during fording and in-water operation of the vehicle.

3. In a heavy duty motor vehicle adapted for cross-country amphibious operation,
   a pressure charged internal combustion engine,
   a plurality of driving wheels supporting the vehicle for over land operation,
   a plurality of housing sealed brakes each associated with one of said driving wheels,
   a plurality of housing sealed wheel driving axles extending transversely of the vehicle from each wheel,
   housing sealed ratio selecting and differential gear means drivingly interconnecting the engine and wheel driving axles,
   first conduit means connected to each of said housing sealed brakes and wheel driving components and selectively connectable to the pressurized air supply of the engine,
   a second pressurized air supply means selectively connectable to supply pressurized air to said first conduit means at a substantially higher pressure than the charging pressure normally supplied to the engine,
   second conduit means connected to return air from said housing sealed brakes and wheel driving components,
   and control valve means including an exhaust port and selectively operable in a first control condition to connect the pressurized air supply of the engine to said first conduit means and to connect said second conduit means to exhaust thereby providing limited pressurized air sealing and cooling ventilation of the several housing sealed drive components and brakes for over land vehicle operation,
   said valve means being selectively operable in a second control condition to close said second conduit means from the exhaust port and to connect said first conduit means for pressurized air supply from said second pressurized air supply means thereby pressurizing the several housing sealed drive components and brakes against water leakage for fording and in-water operation of the vehicle.

References Cited by the Examiner

UNITED STATES PATENTS

| | | | |
|---|---|---|---|
| 2,623,186 | 12/1952 | Wilde | 180—1 |
| 2,650,577 | 9/1953 | Bales | 180—1 |
| 2,782,773 | 2/1957 | Stone | 180—1 |
| 3,044,567 | 7/1962 | Reed et al. | 180—1 |

FOREIGN PATENTS 1,127,696  8/1956  France.

A. HARRY LEVY, *Primary Examiner.*